United States Patent
Brockhaus et al.

(10) Patent No.: US 11,841,253 B2
(45) Date of Patent: Dec. 12, 2023

(54) MAGNETIC-INDUCTIVE FLOWMETER AND METHOD FOR THE MONITORING OF THE FUNCTION OF A MAGNETIC-INDUCTIVE FLOWMETER

(71) Applicant: KROHNE Messtechnik GmbH, Duisburg (DE)

(72) Inventors: Helmut Brockhaus, Oberhausen (DE); Markus Dabrowski, Duisburg (DE); Ralf Kaisler, Bocholt (DE)

(*) Notice: Subject to any disclaimer, the term of this patent is extended or adjusted under 35 U.S.C. 154(b) by 90 days.

(21) Appl. No.: 17/412,906

(22) Filed: Aug. 26, 2021

(65) Prior Publication Data

US 2022/0074768 A1 Mar. 10, 2022

(30) Foreign Application Priority Data

Sep. 9, 2020 (DE) ............ 10 2020 123 492.9

(51) Int. Cl.
*G01F 1/58* (2006.01)
*G01F 1/60* (2006.01)
*G01F 25/10* (2022.01)

(52) U.S. Cl.
CPC .............. *G01F 1/588* (2013.01); *G01F 1/584* (2013.01); *G01F 1/60* (2013.01); *G01F 25/10* (2022.01)

(58) Field of Classification Search
CPC . G01F 1/58; G01F 1/584; G01F 1/588; G01F 1/60; G01F 25/10
See application file for complete search history.

(56) References Cited

U.S. PATENT DOCUMENTS

| | | | |
|---|---|---|---|
| 6,237,424 B1 * | 5/2001 | Salmasi | ............. G01F 1/58 73/861.11 |
| 6,392,416 B1 | 5/2002 | Keech | |
| 10,408,646 B2 | 9/2019 | Spahlinger et al. | |
| 2010/0288054 A1 | 11/2010 | Foss et al. | |
| 2017/0343396 A1 | 11/2017 | Spahlinger et al. | |

FOREIGN PATENT DOCUMENTS

| | | |
|---|---|---|
| DE | 69804857 T2 | 5/2002 |
| DE | 102014119453 A1 | 6/2016 |
| JP | S52122147 A | 10/1977 |

* cited by examiner

*Primary Examiner* — Erika J. Villaluna
(74) *Attorney, Agent, or Firm* — Patrick D. Duplessis

(57) ABSTRACT

A magnetic-inductive flowmeter includes a measuring tube for carrying an electrically conductive medium, a magnetic field generator for generating a magnetic field passing through the medium, two electrodes for tapping a measuring voltage induced in the medium, a ground element electrically connected to the medium, and an evaluation unit. The electrodes are connected to the evaluation unit via electrode lines. The ground element is connected to the evaluation unit via a first ground line for potential equalization between the medium and a reference potential of the evaluation unit. The ground element is connected to the evaluation unit at least indirectly via a second ground line. The first and second ground lines are part of a monitoring circuit for monitoring the connection between the ground element and the evaluation unit. The evaluation unit is designed such that it monitors the connection between the ground element and the evaluation unit.

8 Claims, 3 Drawing Sheets

MAGNETIC-INDUCTIVE FLOWMETER AND METHOD FOR THE MONITORING OF THE FUNCTION OF A MAGNETIC-INDUCTIVE FLOWMETER

TECHNICAL FIELD

The invention relates to a magnetic-inductive flowmeter, having a measuring tube for carrying an electrically conductive medium, having a magnetic field generator for generating a magnetic field passing through the medium, having two electrodes for tapping a measuring voltage induced in the medium, having a ground element electrically connected to the medium, and having an evaluation unit, wherein the electrodes are connected to the evaluation unit via electrode lines, and wherein the ground element is connected to the evaluation unit via a first ground line for potential equalization between the electrically conductive medium and a reference potential of the evaluation unit. In addition, the invention relates to a method for function monitoring of a magnetic-inductive flowmeter.

BACKGROUND

The magnetic-inductive flowmeters in question are known from the prior art and are used to detect the flow of a medium. The measuring tube and the electrodes practically constitute the sensor of the magnetic-inductive flowmeter. The evaluation unit comprises electronic means, such as amplifiers, filters, AD/DA converters, etc., for evaluating the measurement signal of interest, i.e., the induced measurement voltage between the two electrodes, wherein the evaluation unit is usually arranged at a distance from the sensor. The electrical connection between the electrodes and the evaluation unit is established by the electrode leads.

The sensor and the evaluation unit are connected to a common electrical reference potential by establishing an electrical connection between the ground element and the evaluation unit via the first ground line.

The ground element is implemented either by a ground electrode, i.e., a third electrode, or via one or more ground rings, wherein either a ground ring is arranged in the inlet area or in the outlet area, or a ground ring is arranged both in the inlet area and in the outlet area. Alternatively, the ground rings can also be implemented by uncoated sections of the measuring tube.

To ensure correct potential equalization between the medium and the evaluation unit, it is necessary that the ground element is reliably contacted. If the electrical connection between the ground element and the evaluation unit is not consistently ensured—loose connection, loose contact, cable break, variable resistance—this has a direct negative influence on the measurement result.

Accordingly, an object of the invention is to provide an electromagnetic flowmeter that can easily perform a monitoring test of a reliable connection between the ground element and the evaluation unit and a function test of the electrode connections. In addition, an object of the invention is to provide a method with which a function test can be carried out in a simple and reliable manner.

SUMMARY

The object is achieved according to the invention, namely with the disclosed features, in that the ground element is connected to the evaluation unit at least indirectly via a second ground line, that the first ground line and the second ground line are part of a monitoring circuit for monitoring the connection between the ground element and the evaluation unit, and that the evaluation unit is designed such that it monitors the connection between the ground element and the evaluation unit.

In a particularly preferred design of the magnetic-inductive flowmeter according to the invention, the evaluation unit is configured to impress a monitoring current into the monitoring circuit and to measure the voltage drop. When it is said that the voltage drop is measured, it is meant that the voltage drop at a monitoring current path is measured, wherein the monitoring current path is part of the monitoring circuit and the two ground lines are part of the monitoring current path. Alternatively, the evaluation unit is designed to apply a monitoring voltage to the monitoring circuit, or to the monitoring current path, and to measure the current. In both cases, a reference value for the voltage drop or the flowing current is stored in the evaluation unit for the go state of the connection between the ground element and the evaluation unit. The applied voltage or impressed current can be provided as a DC signal. In a preferred design, they are generated as a harmonic AC signal and the impedance of the monitoring current path is detected, in particular as a two-valued quantity (impedance, phase relationship or active and reactive resistance). In this case, a reference value for the impedance in the go state of the device is stored in the evaluation unit. The evaluation unit is also designed to compare the measured value with the reference value.

If a deviation beyond a specified tolerance limit occurs, the evaluation unit can output an error message. In one variation, the error message is output as an acoustic signal; in another variation, the error message is output as an optical signal. In a further preferred variation, the error message is output as a combination of an optical and acoustic signal. In a further preferred variation, the error message is output as an error signal via an interface of the magnetic-inductive flowmeter.

In a very particularly preferred design of the magnetic-inductive flowmeter, the first electrode and the ground element form a first electrode measurement path and the second electrode and the ground element form a second electrode measurement path. The evaluation unit is designed such that it determines an impedance-dependent electrical dimension of the first electrode measurement path and that it determines an impedance-dependent dimension of the second electrode measurement path. An impedance-dependent dimension here can be, for example, a voltage drop (in the case of an impressed current) or a flowing current (in the case of an applied voltage), and in particular an impedance-dependent electrical dimension can also be the impedance of the corresponding electrode measurement path itself. Furthermore, the evaluation unit is designed such that it compares the determined impedance-dependent electrical dimensions with each other and/or with a predetermined reference value and outputs an error signal in the event of a determined deviation beyond a predetermined tolerance range. This design of the magnetic-inductive flowmeter according to the invention makes it possible to detect an electrode error and assign it to a specific electrode, since checking the ground lines can rule out an error that affects both electrode measurement paths equally. For example, a previous measured value can be used as a reference value here.

A particularly preferred design of the magnetic-inductive flowmeter according to the invention is characterized in that the ground element has a terminal and that the first ground line is connected to the ground element via the terminal and that the second ground line is connected to the first ground line. The second ground line is thus indirectly connected to the ground element via the first ground line. Such a design has the advantage that assembly effort is kept very low and that, moreover, existing magnetic-inductive flowmeters can be easily converted in an inventive manner.

In order to also be able to monitor whether the connection between the ground line and the ground element is undamaged, a further particular design of the magnetic-inductive flowmeter according to the invention provides that the ground element has a first terminal and a second terminal and the first ground line is connected to the ground element via the first terminal and the second ground line is connected to the ground element via the second terminal. The more components the monitoring circuit comprises, the more extensive a monitoring of the connection between the ground element and the evaluation unit can be implemented. In the described design, the terminal, i.e., the contact between the ground element and the ground line, is accordingly monitored in addition to the integrity of the ground lines.

A further design of the magnetic-inductive flowmeter according to the invention is characterized in that the electrode lines and the ground lines are combined to form a multi-conductor cable. All lines are thus led to the evaluation unit via a multi-conductor cable. This design allows the electrode lines to be monitored indirectly.

In addition to the magnetic-inductive flowmeter, the invention also relates to a method for monitoring the function of a magnetic-inductive flowmeter. The method according to the invention is carried out on a magnetic-inductive flowmeter, which has a measuring tube for carrying an electrically conductive medium, a magnetic field generator for generating a magnetic field passing through the medium, two electrodes for tapping a measuring voltage induced in the medium, a ground element electrically connected to the medium, and an evaluation unit, wherein the electrodes are connected to the evaluation unit via electrode lines, and wherein the ground element is connected to the evaluation unit via a first ground line for potential equalization between the electrically conductive medium and a reference potential of the evaluation unit, and wherein the ground element is connected to the evaluation unit at least indirectly via a second ground line, wherein the first ground line and the second ground line are part of a monitoring current path of a monitoring circuit for monitoring the connection between the ground element and the evaluation unit.

The method according to the invention is characterized in that first, in a measurement step, the evaluation unit carries out at least one of the following two method steps:
  impressing a monitoring current in the monitoring circuit and measuring the voltage drop in the monitoring current path, or
  applying a monitoring voltage to the monitoring current path and measuring the current flowing in the monitoring current path.

In a comparison step, the evaluation unit compares the measured value for the voltage drop and/or the flowing current and/or a calculated impedance or other impedance-dependent electrical dimension of the monitoring current path with a reference value for the voltage drop, the resulting current, the impedance or the other impedance-dependent electrical dimension for the go state of the connection between the ground element and the evaluation unit. If the values deviate beyond a predetermined tolerance range, the evaluation unit outputs an error signal in an output step.

A particularly preferred further development of the method according to the invention enables the detection of an electrode error of one of the electrodes of the magnetic-inductive flowmeter. The magnetic-inductive flowmeter comprises a first electrode and a second electrode. An electrode error may be, for example, a defective connection between the electrode and the electrode line. The magnetic-inductive flowmeter has a first electrode measurement path and a second electrode measurement path, wherein the first electrode and the ground element are part of the first electrode measurement path, and wherein the second electrode and the ground element are part of the second electrode measurement path. According to the invention, the evaluation unit determines an impedance-dependent electrical dimension of the first electrode measurement path and/or an impedance-dependent electrical dimension of the second electrode measurement path in a determination step. An impedance-dependent dimension in this case can be, for example, a flowing current when a voltage is applied to the electrode measurement path. For example, an impedance-dependent dimension may also be a voltage drop when a current is impressed. However, an impedance-dependent dimension can also be, for example, the impedance of the electrode measurement path itself. In a comparison step, the evaluation unit compares the determined impedance-dependent electrical dimensions with each other and/or with a predetermined comparison value. In a signal output step, the evaluation unit outputs an electrode error signal if a deviation beyond a predetermined tolerance range is detected.

In another further development, in an identification step, the evaluation unit identifies the electrode for which the determined impedance-dependent electrical dimension indicates a higher impedance value as an electrode error. If a voltage drop in an electrode measurement path is determined as an impedance-dependent electrical dimension, an increase in the voltage indicates a higher impedance. If, on the other hand, a flowing current is determined as an impedance-dependent electrical dimension, a lower current value indicates a higher impedance value.

BRIEF DESCRIPTION OF THE DRAWINGS

In detail, there is a plurality of possibilities for designing and further developing the magnetic-inductive flowmeter according to the invention. In this respect, reference is made to the description of preferred embodiments in conjunction with the drawings.

DETAILED DESCRIPTION

Figure 1:
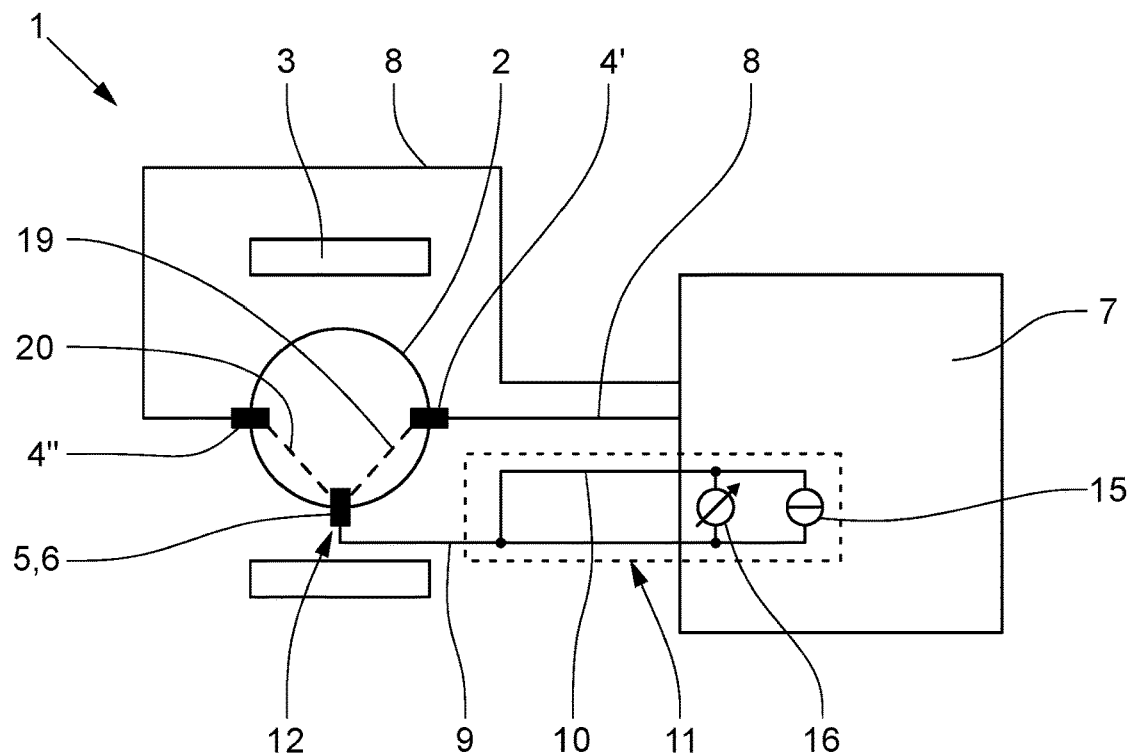
FIG. 1 schematically illustrates a first embodiment of a magnetic-inductive flowmeter.

FIG. 1 shows a magnetic-inductive flowmeter 1 with a measuring tube 2 for carrying an electrically conductive medium. In addition, the magnetic-inductive flowmeter 1 has a magnetic field generator 3 for generating a magnetic field passing through the medium. Two electrodes 4', 4", which are arranged diametrically opposite each other on the measuring tube 2, are used to tap a measuring voltage induced in the medium. In addition to the electrodes 4', 4", the magnetic-inductive flowmeter 1 has a ground element 5 which is electrically connected to the medium.

In the embodiment shown, the ground element 5 is implemented as a ground electrode 6. An evaluation unit 7 is also provided. The electrodes 4 are connected to the evaluation unit 7 via electrode lines 8. The ground element 5 is connected to the evaluation unit 7 via a first ground line 9 for potential equalization between the electrically conductive medium and a reference potential of the evaluation unit. In addition, the ground element 5 is indirectly connected to the evaluation unit 7 via a second ground line 10.

The first ground line 9 and the second ground line 10 are part of a monitoring circuit 11, which is framed in dashed lines in FIG. 1. The monitoring circuit 11 can be used to monitor the connection between the ground element 5 and the evaluation unit 7, in particular to monitor for damage to the ground lines 9, 10 or the connection. For this, the evaluation unit 7 is designed such that it monitors the connection between the ground element 7 and the evaluation unit 7. In the embodiment shown in FIG. 1, the ground line 9 is connected to the ground element 5 via a terminal 12. The second ground line 10 is not directly connected to the ground element 5, but is connected to the first ground line 9.

In FIG. 1, the evaluation unit is designed such that it impresses a monitoring current into the monitoring circuit 11. A current source 15 is provided for this purpose. In addition, it measures the voltage drop in the monitoring circuit, or in a monitoring current path that is part of the monitoring circuit, by means of a voltage measuring device 16. A reference value for the voltage drop for the go state of the connection is stored in the evaluation unit 7. The evaluation unit 7 is accordingly designed to compare the measured voltage drop with the reference value and to output an error signal in the event of deviation beyond a specified tolerance value.

Figure 2:
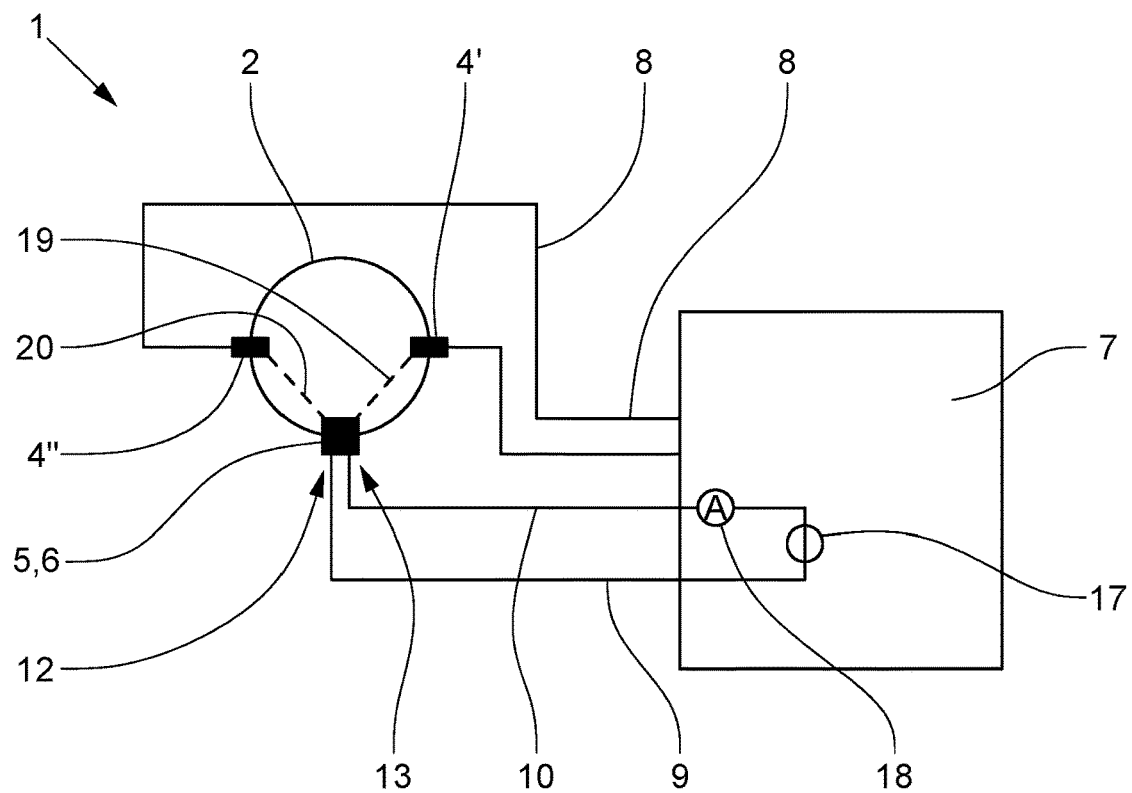
FIG. 2 schematically illustrates a second embodiment of a magnetic-inductive flowmeter.

FIG. 2 shows a further embodiment of a magnetic-inductive flowmeter 1. In contrast to the embodiment shown in FIG. 1, here the second ground line 10 is connected to the ground element 5 via a separate second terminal 13.

In addition, the evaluation unit 7 is implemented such that it applies a voltage to a monitoring current path, which is a component of the monitoring circuit 11, via a voltage source 17 and measures the falling current by means of a current measuring device 18. A reference value for the falling current in the go state of the connection between the ground element 5 and the evaluation unit 7 is then stored in evaluation unit 7. A comparison of the measured current value and the reference value is carried out by the evaluation unit 7 and, again, an error signal is output in the event of a deviation beyond a specified tolerance range. The error signal can be output as an acoustic signal, for example, and the output of an optical signal is also conceivable. The design of the magnetic-inductive flowmeter 1 as shown in FIG. 2 has the advantage that the functional connection of the ground line 9 via the terminal 12 to the ground element 5 can also be monitored. Since both the first terminal 12 and the second terminal 13 are part of the monitoring circuit, this allows for a larger monitoring area.

In both FIG. 1 and FIG. 2, a first electrode measurement path 19 and a second electrode measurement path 20 are shown. The first electrode measurement path 19 comprises the first electrode 4' and the ground element 5, and the second electrode measurement path 20 comprises the second electrode 4" and the ground element 5. The control and evaluation unit 7 is designed such that it determines an impedance-dependent electrical dimension of the first electrode measurement path 19 and the second electrode measurement path 20. In the embodiments shown, the impedance of the electrode measurement paths 19, 20 is determined itself. Furthermore, the control and evaluation unit 7 is designed such that it compares the determined values with a reference value and outputs an electrode error signal in the event of deviation beyond a predetermined tolerance range. The control and evaluation unit 7 identifies an electrode 4', 4" as faulty if the determined impedance value deviates upward from the reference value.

Figure 3:
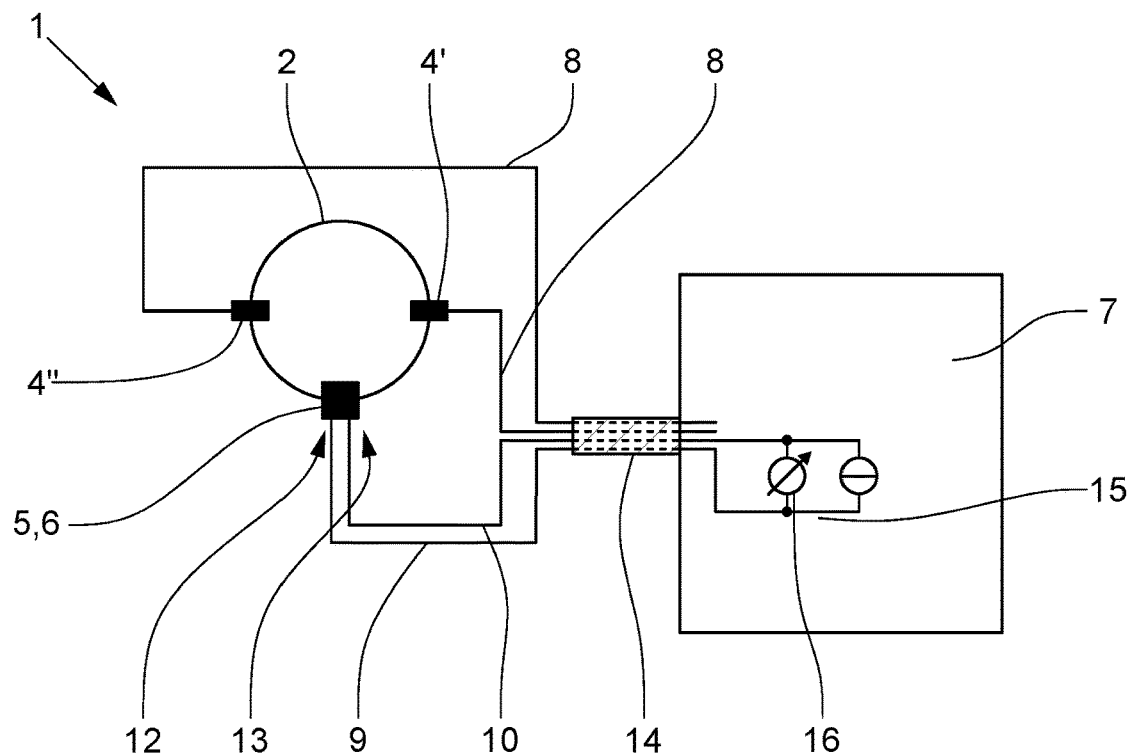
FIG. 3 schematically illustrates a third embodiment of a magnetic-inductive flowmeter.

FIG. 3 shows a further embodiment of a magnetic-inductive flowmeter 1. In contrast to the embodiment shown in FIG. 2, the two electrode lines 8 and the ground lines 9, 10 are combined in a multi-conductor cable 14. Since all lines are combined in a multi-conductor cable 14, the electrode lines 8 are also monitored simultaneously with the ground lines 9, 10. Also in contrast to FIG. 2, a monitoring current is applied in the monitoring circuit and the voltage drop is measured.

Figure 4:
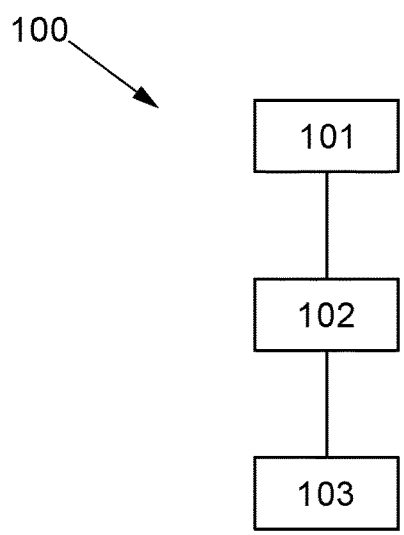
FIG. 4 illustrates a block diagram of a method for monitoring the function of a magnetic-inductive flowmeter.

FIG. 4 shows a block diagram of a method 100 for monitoring of the function of a magnetic-inductive flowmeter shown in FIG. 1. In a measuring step 101, the evaluation unit of the magnetic-inductive flowmeter carries out at least one of the following two method steps:
  impressing a monitoring current into the monitoring circuit and measuring the voltage drop in the monitoring current path, or
  applying a monitoring voltage to the monitoring current path and measuring the current flowing in the monitoring circuit.

In a comparison step 102, the evaluation unit compares the measured value for the voltage drop and/or the flowing current and/or a calculated impedance of the monitoring current path with a reference value for the voltage drop, the resulting current or the impedance for the go state of the connection between the ground element and the evaluation unit. In an output step 103, the evaluation unit outputs an error signal when the values deviate beyond a predetermined tolerance range.

Figure 5:
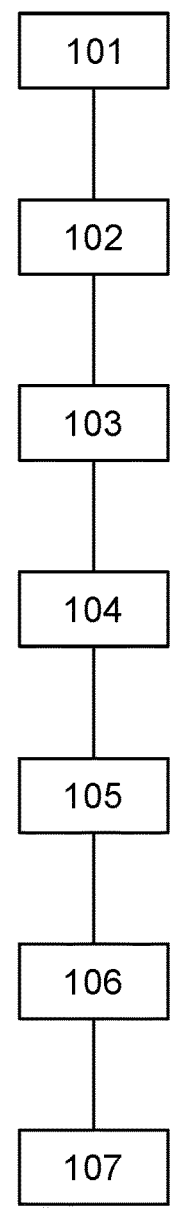
FIG. 5 illustrates a block diagram of a more advanced method for monitoring the function of a magnetic-inductive flowmeter.

FIG. 5 shows a further development of the method shown in FIG. 4. The first three method steps 101, 102 and 103 are also carried out in the method shown here. The magnetic-inductive flowmeter in which the method illustrated here is carried out has a first electrode measurement path and a second electrode measurement path, wherein the first electrode and the ground element are part of the first electrode measurement path and wherein the second electrode and the ground element are part of the second electrode measurement path. In a determination step 104, the evaluation unit determines an impedance-dependent electrical dimension of the first electrode measurement path and/or an impedance-dependent electrical dimension of the second electrode measurement path. In a comparison step 105, the evaluation unit compares the determined impedance-dependent electrical dimensions with each other and/or with a predetermined comparison value. In a signal output step 106, the evaluation unit outputs an electrode error signal if a deviation beyond a predetermined tolerance range is detected. In an identification step 107, the evaluation unit identifies the electrode for which the determined impedance-dependent electrical dimension indicates a higher impedance value as a faulty electrode.

The invention claimed is:
1. A magnetic-inductive flowmeter, comprising:
  a measuring tube for carrying an electrically conductive medium;

a magnetic field generator for generating a magnetic field passing through the medium;

two electrodes for tapping a measuring voltage induced in the medium;

a ground element electrically connected to the medium; and an evaluation unit;

wherein the electrodes are connected to the evaluation unit via electrode lines;

wherein the ground element is connected to the evaluation unit via a first ground line for potential equalization between the electrically conductive medium and a reference potential of the evaluation unit;

wherein the ground element is connected to the evaluation unit at least indirectly via a second ground line;

wherein the first ground line and the second ground line are part of a monitoring circuit for monitoring the connection between the ground element and the evaluation unit;

wherein the evaluation unit is designed to monitor the connection between the ground element and the evaluation unit;

wherein the evaluation unit is designed to impress a monitoring current into the monitoring circuit and measure the voltage drop in the monitoring circuit, or the evaluation unit is designed to apply a monitoring voltage to the monitoring circuit and measure the current flowing in the monitoring circuit; and wherein a reference value for the voltage drop, the resulting current or a measured impedance of the monitoring circuit is stored in the evaluation unit for a go state of the connection between the round element and the evaluation unit, and the evaluation unit compares the measured value with the reference value.

2. The magnetic-inductive flowmeter according to claim 1, wherein the first electrode and the ground element form a first electrode measurement path, and the second electrode and the ground element form a second electrode measurement path;

wherein the evaluation unit is designed to determine an impedance-dependent electrical dimension of the first electrode measurement path, and is designed to determine an impedance-dependent electrical dimension of the second electrode measurement path; and wherein the evaluation unit is further designed to compare the determined impedance-dependent electrical dimensions with one another or with a predetermined reference value and outputs an error signal in the event of a determined deviation beyond a predetermined tolerance range.

3. The magnetic-inductive flowmeter according to claim 1, wherein the ground element has a terminal;

wherein the first ground line is connected to the ground element via the terminal; and wherein the second ground line is connected to the first ground line, so that the second ground line is indirectly connected to the ground element via the first ground line.

4. The magnetic-inductive flowmeter according to claim 1, wherein the ground element has a first terminal and a second terminal;

wherein the first ground line is connected to the ground element via the first terminal; and wherein the second ground line is connected to the ground element via the second terminal.

5. The magnetic-inductive flowmeter according to claim 1, wherein the electrode lines and the ground lines are combined in a multi-conductor cable.

6. A method for function monitoring of a magnetic-inductive flowmeter, wherein the magnetic-inductive flowmeter has a measuring tube for carrying an electrically conductive medium, a magnetic field generator for generating a magnetic field passing through the medium, two electrodes for tapping a measuring voltage induced in the medium, a ground element electrically connected to the medium, and an evaluation unit, wherein the electrodes are connected to the evaluation unit via electrode lines, and wherein the ground element is connected to the evaluation unit via a first ground line for potential equalization between the electrically conductive medium and a reference potential of the evaluation unit, and wherein the ground element is connected to the evaluation unit at least indirectly via a second ground line, wherein the first ground line and the second ground line are part of a monitoring current path of a monitoring circuit for monitoring the connection between the ground element and the evaluation unit, the method comprising:

a measurement step in which the evaluation unit performs at least one of the following two steps:

impressing a monitoring current in the monitoring circuit and measuring the voltage drop in the monitoring current path; or applying a monitoring voltage to the monitoring current path and measuring the current flowing in the monitoring current path;

a comparison step in which the evaluation unit compares the measured value for the voltage drop and/or the flowing current and/or a calculated impedance of the monitoring current path with a reference value for the voltage drop, the resulting current or the impedance for a go state of the connection between the ground element and the evaluation unit; and if the values deviate beyond a predetermined tolerance range, an output step is performed in which the evaluation unit outputs an error signal.

7. The method according to claim 6, wherein the magnetic-inductive flowmeter has a first electrode measurement path and a second electrode measurement path;

wherein the first electrode and the ground element are part of the first electrode measurement path and wherein the second electrode and the ground element are part of the second electrode measurement path;

wherein the method further comprises a determination step in which the evaluation unit determines an impedance-dependent electrical dimension of the first electrode measurement path and/or an impedance-dependent electrical dimension of the second electrode measurement path;

wherein the method further comprises a second comparison step in which the evaluation unit compares the determined impedance-dependent electrical dimensions with one another and/or with a predetermined comparison value; and wherein the method further comprises a signal output step, in which the evaluation unit outputs an electrode error signal in the event of a detected deviation beyond a predetermined tolerance range.

8. The method according to claim 7, wherein the method further comprises an identification step in which the electrode for which the determined impedance-dependent electrical dimension indicates a higher impedance value is identified as a faulty electrode.

* * * * *